US010440564B2

(12) United States Patent
Liao et al.

(10) Patent No.: US 10,440,564 B2
(45) Date of Patent: *Oct. 8, 2019

(54) APPARATUSES AND METHODS FOR AVOIDING LOCATION EXPOSURE

(71) Applicant: MediaTek Inc., Hsin-Chu (TW)

(72) Inventors: Shih-Chieh Liao, Kaohsiung (TW); Chun-Pin Chen, Taoyuan (TW); Tsung-Liang Lu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,331

(22) Filed: Apr. 25, 2018

(65) Prior Publication Data

US 2018/0242146 A1    Aug. 23, 2018

Related U.S. Application Data

(63) Continuation of application No. 15/821,937, filed on Nov. 24, 2017, now Pat. No. 9,986,430, which is a
(Continued)

(51) Int. Cl.
*H04M 1/66* (2006.01)
*H04W 12/02* (2009.01)
(Continued)

(52) U.S. Cl.
CPC ............ *H04W 12/02* (2013.01); *G06F 21/74* (2013.01); *H04W 8/18* (2013.01);
(Continued)

(58) Field of Classification Search
CPC ..... H04W 12/02; H04W 76/19; H04W 76/18; H04W 76/24; H04W 4/025;
(Continued)

(56) References Cited

U.S. PATENT DOCUMENTS 8,526,937 B2    9/2013    Wu
8,577,360 B2    11/2013   Olsson
(Continued)

FOREIGN PATENT DOCUMENTS

CN          1852613 A       10/2006
CN        101242629 A        8/2008
(Continued)

*Primary Examiner* — Mahendra R Patel
(74) *Attorney, Agent, or Firm* — McClure, Qualey & Rodack, LLP

(57) ABSTRACT

A mobile communication device for avoiding location exposure in a User Equipment (UE) information procedure includes a wireless transceiver configured to perform wireless transmission and reception to and from a service network. The device further includes a controller, configured to determine whether a Radio Resource Control (RRC) security has been activated between the mobile communication device and the service network, and in response to the RRC security not having been activated, does not send a measurement report to the service network via the wireless transceiver after receiving measurement configuration message, wherein the controller is further configured to send the measurement report after the RRC security has been activated.

15 Claims, 7 Drawing Sheets

Related U.S. Application Data continuation of application No. 15/254,121, filed on Sep. 1, 2016, now Pat. No. 9,860,743.

(60) Provisional application No. 62/222,428, filed on Sep. 23, 2015, provisional application No. 62/216,416, filed on Sep. 10, 2015.

(51) Int. Cl.
  | | |
  |---|---|
  | *H04W 76/18* | (2018.01) |
  | *H04W 76/19* | (2018.01) |
  | *H04W 76/27* | (2018.01) |
  | *H04W 24/10* | (2009.01) |
  | *H04W 36/00* | (2009.01) |
  | *H04W 8/18* | (2009.01) |
  | *H04W 24/02* | (2009.01) |
  | *G06F 21/74* | (2013.01) |
  | *H04W 12/00* | (2009.01) |
  | *H04W 4/02* | (2018.01) |

(52) U.S. Cl.
CPC ....... *H04W 12/0017* (2019.01); *H04W 24/02* (2013.01); *H04W 24/10* (2013.01); *H04W 36/0088* (2013.01); *H04W 76/18* (2018.02); *H04W 76/19* (2018.02); *H04W 76/27* (2018.02); *G06F 2221/2111* (2013.01); *H04W 4/025* (2013.01)

(58) Field of Classification Search
CPC . H04W 36/0088; H04W 24/10; H04W 24/02; H04W 76/38; H04W 12/04; H04W 76/30; H04W 12/06; H04W 12/0017; G06F 21/74; G06F 2221/2111; H04L 63/20
USPC .......................................... 455/411; 370/331
See application file for complete search history.

(56) References Cited

U.S. PATENT DOCUMENTS

| | | | |
|---|---|---|---|
| 8,768,335 | B2 | 7/2014 | Yi |
| 8,804,656 | B2 | 8/2014 | Kitazoe |
| 8,937,895 | B2 | 1/2015 | Xu |
| 9,332,391 | B2 | 5/2016 | Butala |
| 9,370,039 | B2 | 6/2016 | Uchiyama et al. |
| 9,426,700 | B2 * | 8/2016 | Hahn ................ H04W 36/0055 |
| 2008/0123851 | A1 * | 5/2008 | Guccione ............. H04L 63/061 380/270 |
| 2008/0305797 | A1 * | 12/2008 | Somasundaram .... H04W 24/10 455/436 |
| 2009/0042576 | A1 * | 2/2009 | Mukherjee .......... H04J 11/0093 455/436 |
| 2010/0014429 | A1 | 1/2010 | Kim |
| 2010/0317347 | A1 * | 12/2010 | Burbidge .......... H04W 36/0088 455/436 |
| 2011/0081868 | A1 | 4/2011 | Kim |
| 2011/0201324 | A1 | 8/2011 | Persson |
| 2011/0312306 | A1 * | 12/2011 | Wu ....................... H04W 24/10 455/414.1 |
| 2012/0040677 | A1 * | 2/2012 | Chen ................... H04W 76/20 455/436 |
| 2012/0058775 | A1 | 3/2012 | Dupray |
| 2012/0281566 | A1 * | 11/2012 | Pelletier ............. H04W 76/27 370/252 |
| 2013/0016639 | A1 * | 1/2013 | Xu .......................... H04L 5/001 370/311 |
| 2013/0040634 | A1 | 2/2013 | Johansson |
| 2013/0122918 | A1 * | 5/2013 | Boley ............... H04W 52/0212 455/450 |
| 2013/0183908 | A1 * | 7/2013 | Jung .................... H04W 24/10 455/67.11 |
| 2013/0260740 | A1 * | 10/2013 | Rayavarapu .......... H04W 76/27 455/422.1 |
| 2013/0260810 | A1 * | 10/2013 | Rayavarapu .......... H04W 76/19 455/509 |
| 2013/0260811 | A1 * | 10/2013 | Rayavarapu .......... H04W 76/19 455/509 |
| 2013/0337812 | A1 * | 12/2013 | Pekonen ............. H04W 36/125 455/436 |
| 2013/0343280 | A1 * | 12/2013 | Lee ........................ H04L 63/20 370/328 |
| 2014/0016593 | A1 * | 1/2014 | Park ........................ H04L 5/001 370/329 |
| 2014/0044105 | A1 * | 2/2014 | Bontu ..................... H04L 5/001 370/336 |
| 2014/0050086 | A1 * | 2/2014 | Himayat ............ H04N 21/2365 370/230 |
| 2014/0056243 | A1 * | 2/2014 | Pelletier ................ H04W 74/04 370/329 |
| 2014/0068307 | A1 * | 3/2014 | Koskinen .......... H04W 52/0209 713/323 |
| 2014/0073364 | A1 * | 3/2014 | Chuang ................. H04W 24/10 455/456.6 |
| 2014/0148169 | A1 * | 5/2014 | Li ....................... H04W 36/0061 455/437 |
| 2014/0153390 | A1 * | 6/2014 | Ishii .................. H04W 28/0289 370/230 |
| 2014/0204771 | A1 * | 7/2014 | Gao ....................... H04W 36/28 370/252 |
| 2014/0349662 | A1 * | 11/2014 | Ekici ..................... H04W 76/16 455/450 |
| 2015/0017993 | A1 * | 1/2015 | Ishii ................... H04W 36/0011 455/444 |

FOREIGN PATENT DOCUMENTS

| | | | |
|---|---|---|---|
| CN | 101714912 A | 5/2010 | |
| CN | 102469630 A | 5/2012 | |
| WO | 2008/084938 A1 | 7/2008 | |
| WO | 2013/162331 A1 | 10/2013 | |
| WO | 2013/181421 A3 | 12/2013 | |
| WO | WO-2014019168 A1 * | 2/2014 | .......... H04L 5/0094 |
| WO | 2014/090616 A1 | 6/2014 | |
| WO | 2016/007383 A1 | 1/2016 | |

* cited by examiner

APPARATUSES AND METHODS FOR AVOIDING LOCATION EXPOSURE

CROSS REFERENCE TO RELATED APPLICATIONS

This Application is a Continuation of U.S. patent application Ser. No. 15/821,937, filed on Nov. 24, 2017, which is a Continuation of 15/254,121, filed on Sep. 1, 2016 (now U.S. Pat. No. 9,860,743, issued on Jan. 2, 2018), which claims priority of U.S. Provisional Application No. 62/216,416, filed on Sep. 10, 2015, the entirety of which is incorporated by reference herein. Application Ser. No. 15/254,121 also claims priority of U.S. Provisional Application No. 62/222,428, filed on Sep. 23, 2015, the entirety of which is incorporated by reference herein.

BACKGROUND OF THE APPLICATION

Field of the Application

The application generally relates to User Equipment (UE) information confidentiality, and more particularly, to apparatuses and methods for avoiding location exposure.

Description of the Related Art

With growing demand for ubiquitous computing and networking, various wireless technologies have been developed, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) 1x technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

Take the LTE technology as an example: according to release 13 of the 3rd Generation Partnership Project (3GPP) Technical Specification (TS) 36.331, a Measurement Report message and a UE Information Response message may be sent unprotected before the Radio Resource Control (RRC) security is activated. Specifically, the Measurement Report message and the UE Information Response message may each include location information relating to the UE, and having these two messages sent out unprotected may lead to the risk of information leakage. For example, these two messages may be passively captured in the air by any interested parties, including malicious attackers, and the location information therein may be used to derive the user's position. Thus, it is desirable to improve UE's processing of unprotected messages which may include location information, thereby avoiding location exposure on insecure communications.

BRIEF SUMMARY OF THE APPLICATION

In a first aspect of the application, a mobile communication device comprising a wireless transceiver and a controller is provided. The wireless transceiver is configured to perform wireless transmission and reception to and from a service network. The controller is configured to determine whether an RRC security has been activated between the mobile communication device and the service network when receiving measurement configuration from the service network via the wireless transceiver, and in response to the RRC security not having been activated and location information of the mobile communication device being present, send a first measurement report not comprising the location information of the mobile communication device, or not send a second measurement report comprising the location information of the mobile communication device, to the service network via the wireless transceiver.

In a second aspect of the application, a method for a mobile communication device to avoid location exposure in measurement reporting is provided. The method comprises the steps of: determining whether an RRC security has been activated between the mobile communication device and a service network when receiving measurement configuration from the service network; and in response to the RRC security not having been activated and location information of the mobile communication device being present, sending a first measurement report not comprising the location information of the mobile communication device, or not sending a second measurement report comprising the location information of the mobile communication device, to the service network.

In a third aspect of the application, a mobile communication device comprising a wireless transceiver and a controller is provided. The wireless transceiver is configured to perform wireless transmission and reception to and from a service network. The controller is configured to determine whether an RRC security has been activated between the mobile communication device and the service network when receiving a User Equipment (UE) Information Request message from the service network via the wireless transceiver, and in response to the RRC security not having been activated and location information of the mobile communication device being present, send a first UE Information Response message not comprising the location information of the mobile communication device, or not send a second UE Information Response comprising the location information of the mobile communication device, to the service network via the wireless transceiver. Alternatively, the controller is configured to determine whether the RRC security has been activated between the mobile communication device and the service network when receiving an RRC Connection Re-Establishment message, an RRC Connection Setup message, or an RRC Connection Reconfiguration message from the service network via the wireless transceiver, and in response to the RRC security not having been activated and the location information of the mobile communication device being present, send an RRC Connection Re-Establishment Complete message, an RRC Connection Setup Complete message, or an RRC Connection Reconfiguration Complete message, which does not comprise an availability of the location information of the mobile communication device, to the service network via the wireless transceiver.

In a fourth aspect of the application, a method for a mobile communication device to avoid location exposure in a UE information procedure is provided. The method comprises the steps of: determining whether an RRC security has been activated between the mobile communication device and a service network in response to receiving a UE Information Request message from the service network; and in response to the RRC security not having been activated and location information of the mobile communication device being present, sending a first UE Information Response message not comprising the location information of the mobile communication device, or not sending a second UE Information Response comprising the location information of the mobile communication device, to the service network.

In a fifth aspect of the application, a method for a mobile communication device to avoid location exposure in a UE information procedure is provided. The method comprises the steps of: determining whether an RRC security has been activated between the mobile communication device and the service network when receiving an RRC Connection Re-Establishment message, an RRC Connection Setup message, or an RRC Connection Reconfiguration message from the service network; and in response to the RRC security not having been activated and the location information of the mobile communication device being present, sending an RRC Connection Re-Establishment Complete message, an RRC Connection Setup Complete message, or an RRC Connection Reconfiguration Complete message, which does not comprise an availability of the location information of the mobile communication device, to the service network.

Other aspects and features of the present application will become apparent to those with ordinarily skill in the art upon review of the following descriptions of specific embodiments of the mobile communication devices and the methods for avoiding location exposure.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
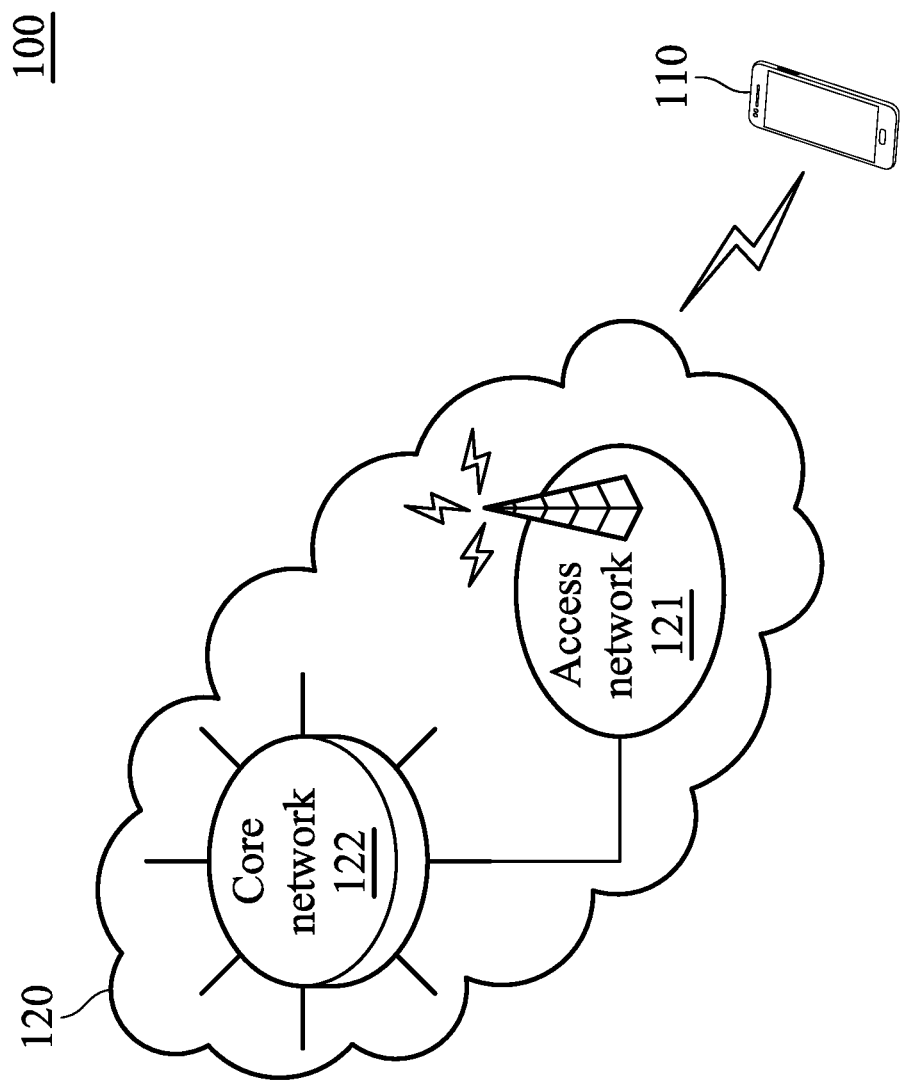
FIG. 1 is a block diagram of a wireless communication environment according to an embodiment of the invention.

FIG. 1 is a block diagram of a wireless communication environment according to an embodiment of the invention. The wireless communication environment 100 comprises a mobile communication device 110 and a service network 120, wherein the mobile communication device 110 is wirelessly connected to the service network 120 for obtaining mobile services. The mobile communication device 110 may be referred to as User Equipment (UE), such as a feature phone, a smartphone, a panel Personal Computer (PC), a laptop computer, or any computing device supporting the wireless technology utilized by the service network 120. The service network 120 may be an LTE/LTE-A/TD-LTE network.

Specifically, the service network 120 comprises an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet). Each of the access network 121 and the core network 122 may comprise one or more network nodes for carrying out said functions. For example, the access network 121 may be an Evolved-UTRAN (E-UTRAN) which includes at least an evolved NB (eNB), and the core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW).

Figure 2:
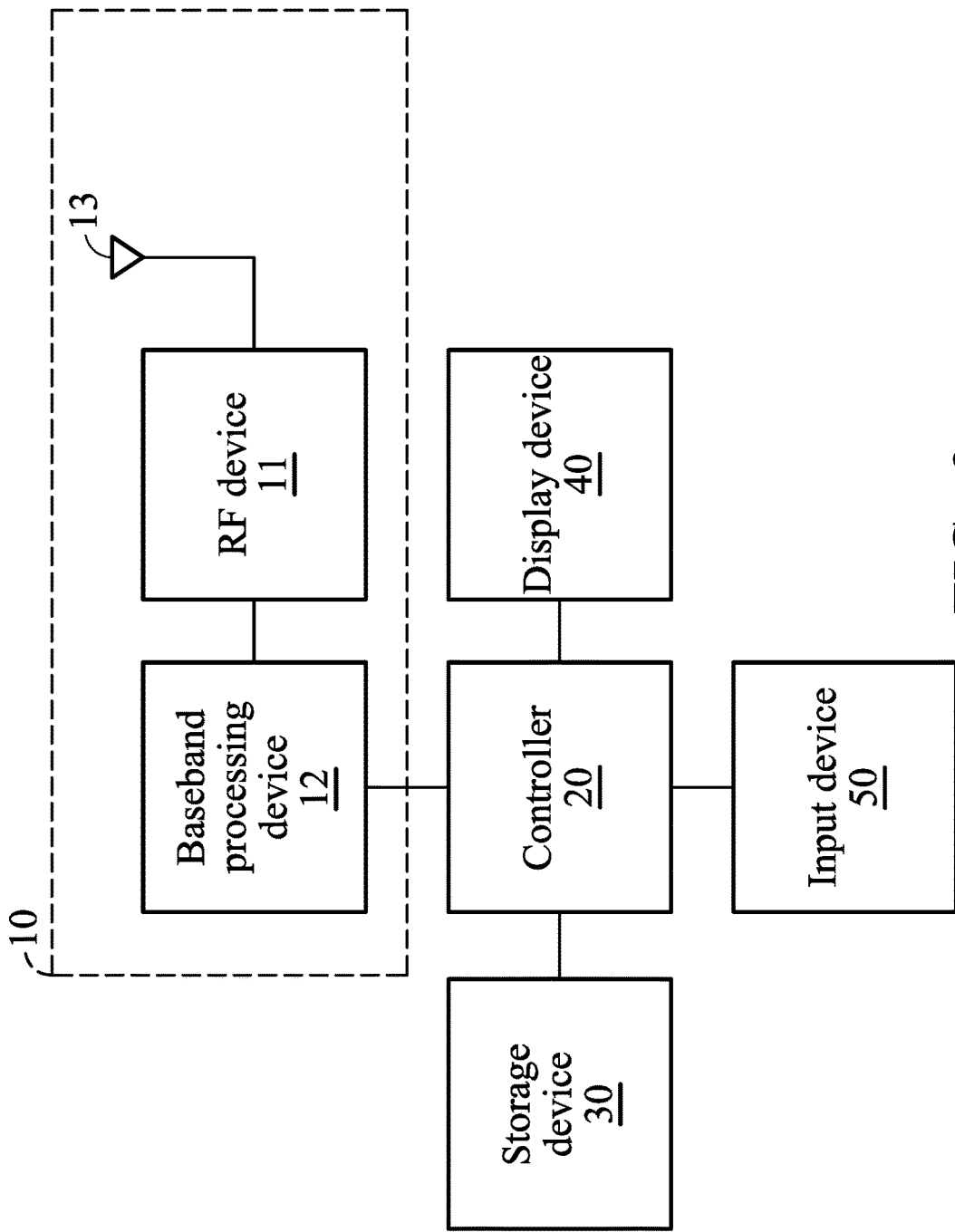
FIG. 2 is a block diagram illustrating the mobile communication device 110 according to an embodiment of the application.

FIG. 2 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service network 120. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be 900 MHz, 2100 MHz, or 2.6 GHz utilized in LTE/LTE-A/TD-LTE technology, or another radio frequency, depending on the wireless technology in use.

The controller 20 may be a general-purpose processor, a Micro Control Unit (MCU), an application processor, a Digital Signal Processor (DSP), or the like, for controlling the wireless transceiver 10 for wireless communications with the service network 120, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method of the present application.

In another embodiment, the controller 20 may be incorporated into the baseband processing device 12, serving as a baseband processor.

The storage device 30 may be a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 40 may be a Liquid-Crystal Display (LCD), Light-Emitting Diode (LED) display, or Electronic Paper Display (EPD), etc., for providing a display function. Alternatively, the display device 30 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MIMI) for interaction with users.

It should be understood that the components described in the embodiment of FIG. 2 are for illustrative purposes only and are not intended to limit the scope of the application.

Figure 3:
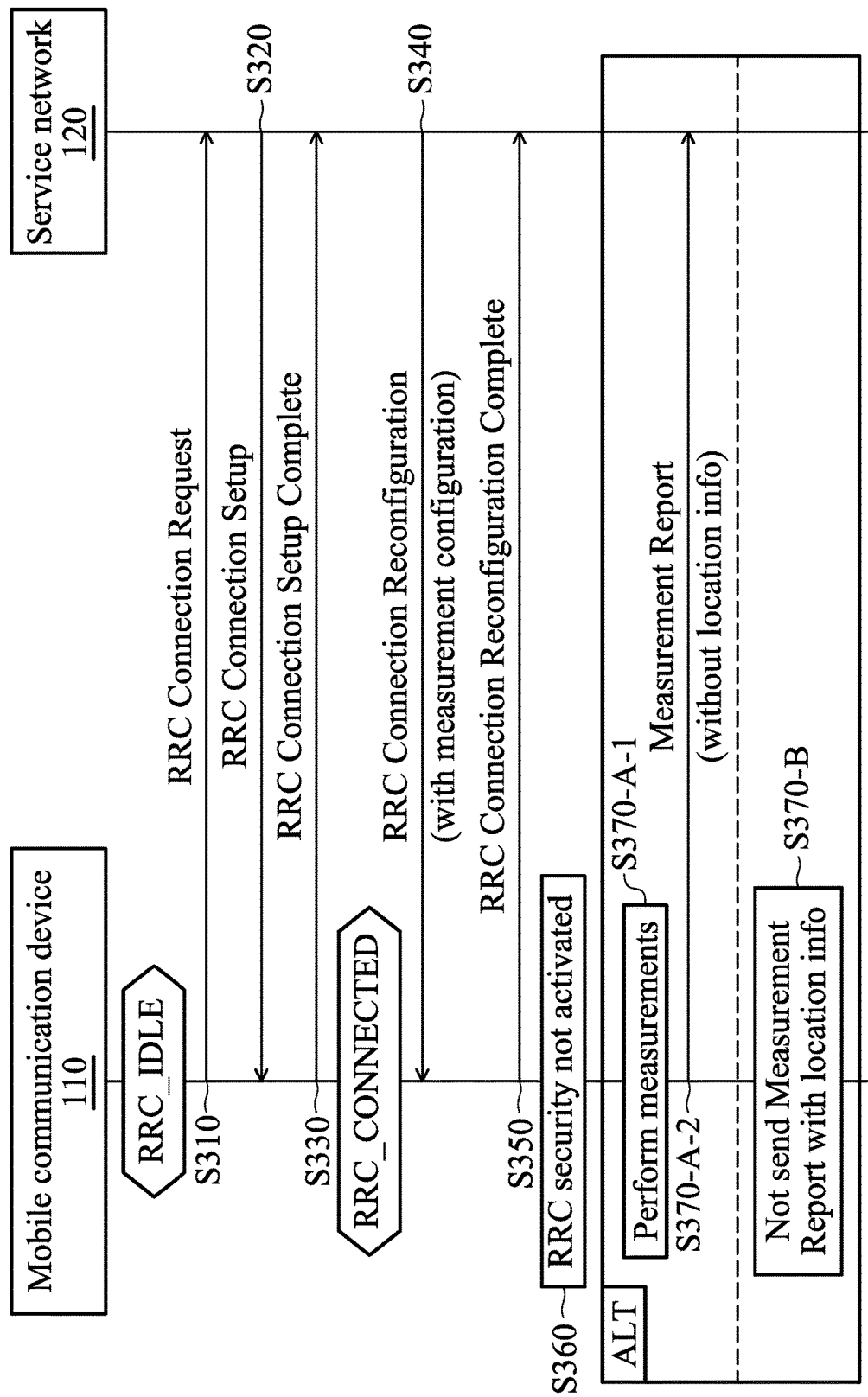
FIG. 3 is a message sequence chart illustrating the method for avoiding location exposure in measurement reporting according to an embodiment of the application.

FIG. 3 is a message sequence chart illustrating the method for avoiding location exposure in measurement reporting according to an embodiment of the application. To begin, the mobile communication device 110 initiates an RRC connection establishment procedure by sending an RRC Connection Request message to the service network 120 (step S310). Next, the mobile communication device 110 receives an RRC Connection Setup message from the service network 120 (step S320). Specifically, the RRC Connection Setup message may include configuration for Signaling Radio Bearer 1 (SRB1) which allows subsequent signaling to use the Dedicated Control Channel (DCCH). Also, the RRC Connection Setup message may include configuration for Physical Uplink Shared Channel (PUSCH), Physical Uplink Control Channel (PUCCH), and Physical Downlink Shared Channel (PDSCH), and information of uplink power control, Channel Quality Indicator (CQI) reporting, the Sounding Reference Signal (SRS), antenna configuration and scheduling requests.

Subsequently, the mobile communication device 110 replies to the service network 120 with an RRC Connection Setup Complete message (step S330), and the RRC connection establishment procedure ends. Please note that the operational state of the mobile communication device 110 switches from the idle mode (i.e., RRC_IDLE mode) to the connected mode (i.e., RRC_CONNECTED mode) once completing the RRC connection establishment procedure.

Later, the mobile communication device 110 receives an RRC Connection Reconfiguration message including measurement configuration from the service network 120 (step S340), and replies to the service network 120 with an RRC Connection Reconfiguration Complete message to acknowledge the acceptance of the RRC Connection Reconfiguration message (step S350). Specifically, the RRC Connection Reconfiguration message is used to setup or modify measurement configuration for the mobile communication device 110. The measurement configuration may include information for specifying measurement objects (i.e., the frequencies to be measured) and the report criteria for each measurement object.

When receiving the RRC Connection Reconfiguration message including measurement configuration, the mobile communication device 110 determines whether the RRC security has been activated (step S360). In this embodiment, it is assumed that the RRC security has not been activated and the location information of the mobile communication device 110 is present. Specifically, the location information of the mobile communication device 110 may include the Global Positioning System (GPS) information of the mobile communication device 110 and/or the measurement result(s) of neighboring cell(s).

In one embodiment to follow step S360, the mobile communication device 110 performs measurements according to the measurement configuration (step S370-A-1), and sends a Measurement Report message not including the location information of the mobile communication device 110 to the service network 120 when a reporting criterion is satisfied (step S370-A-2). According to release 12 of the 3GPP TS 36.331, the GPS information may be included in a "LocationInfo-r10" Information Element (IE) and the measurement result(s) of neighboring cell(s) may be included in a "measResultNeighCells" IE. That is, the Measurement Report message only includes the measurement result of the serving cell, and does not include the "LocationInfo-r10" IE and the "measResultNeighCells" IE.

In another embodiment to follow step S360, the mobile communication device 110 does not send a Measurement Report message including the location information of the mobile communication device 110 to the service network 120 even when a reporting criterion is satisfied (step S370-B). As an exemplary implementation of the embodiment, the mobile communication device 110 may not perform measurements or system information acquisition according to the measurement configuration until the RRC security has been activated, and thus, there will be no measurement result to report. As another exemplary implementation of the embodiment, the mobile communication device 110 may perform measurements or system information acquisition according to the measurement configuration, but it may not perform evaluations of the measurement results until the RRC security has been activated. As yet another exemplary implementation of the embodiment, the mobile communication device 110 may perform measurements or system information acquisition according to the measurement configuration, and perform evaluations of the measurement results, but it may delay the sending of the Measurement Report message until the RRC security has been activated. As still another exemplary implementation of the embodiment, the mobile communication device 110 may perform measurements or system information acquisition according to the measurement configuration, and perform evaluations of the measurement results, but it may discard the Measurement Report message until the RRC security has been activated. For example, the mobile communication device 110 may configure the RRC layer of the communication protocol to send the Measurement Report message to lower layers, and leaves the control to the Layer 2 (L2) of the communication protocol to decide whether to pass the Measurement Report message to the Layer 1 (L1) of the communication protocol.

It should be noted that the detailed description of RRC establishment procedure and the RRC connection reconfiguration is omitted herein for brevity since it is beyond the scope of the application, and reference may be made to the 3GPP TS 36.331, v12.4.0.

Figure 4A:
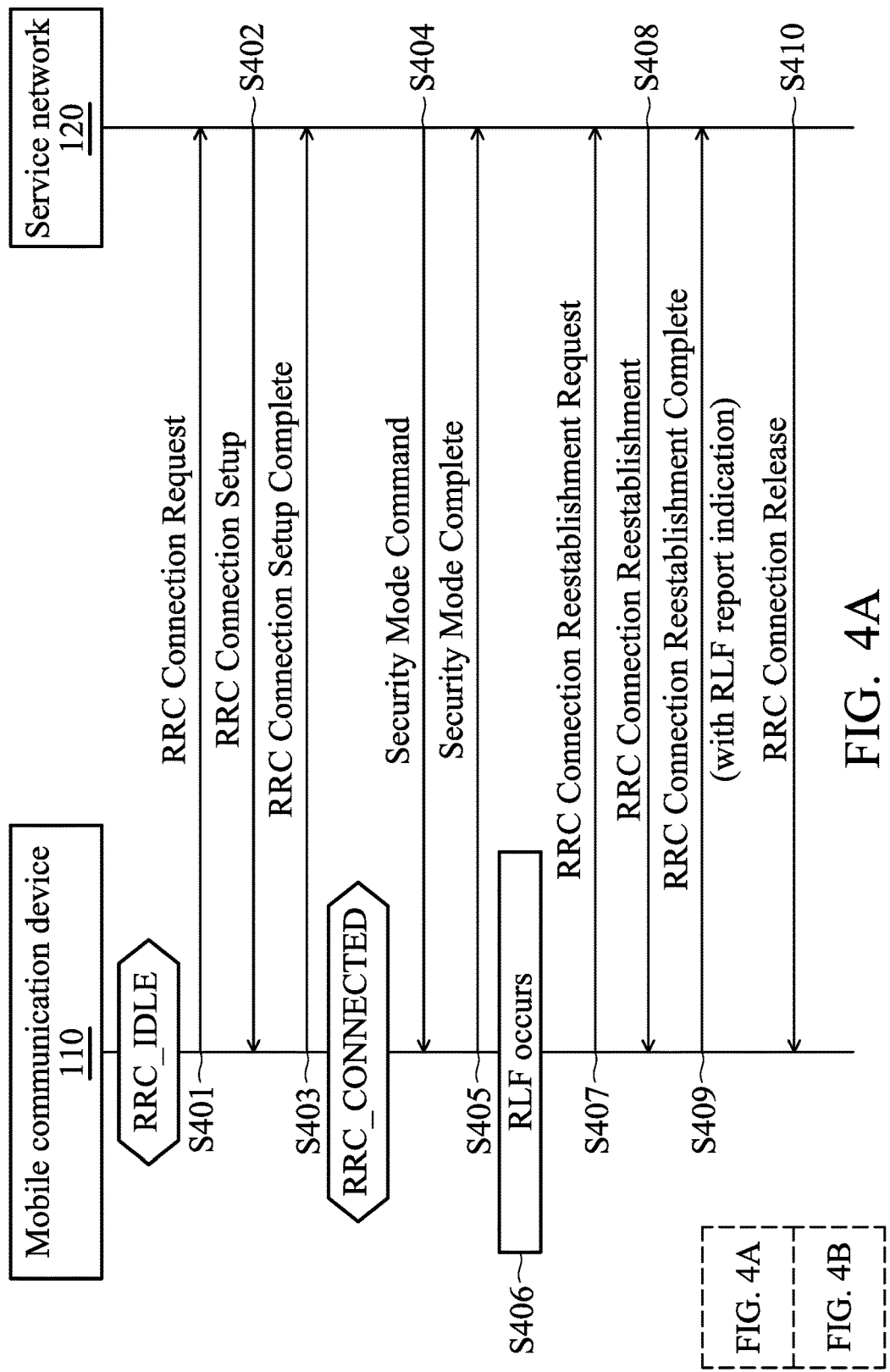
FIGS. 4A and 4B show a message sequence chart illustrating the method for avoiding location exposure in a UE information procedure according to an embodiment of the application.
Figure 4B:
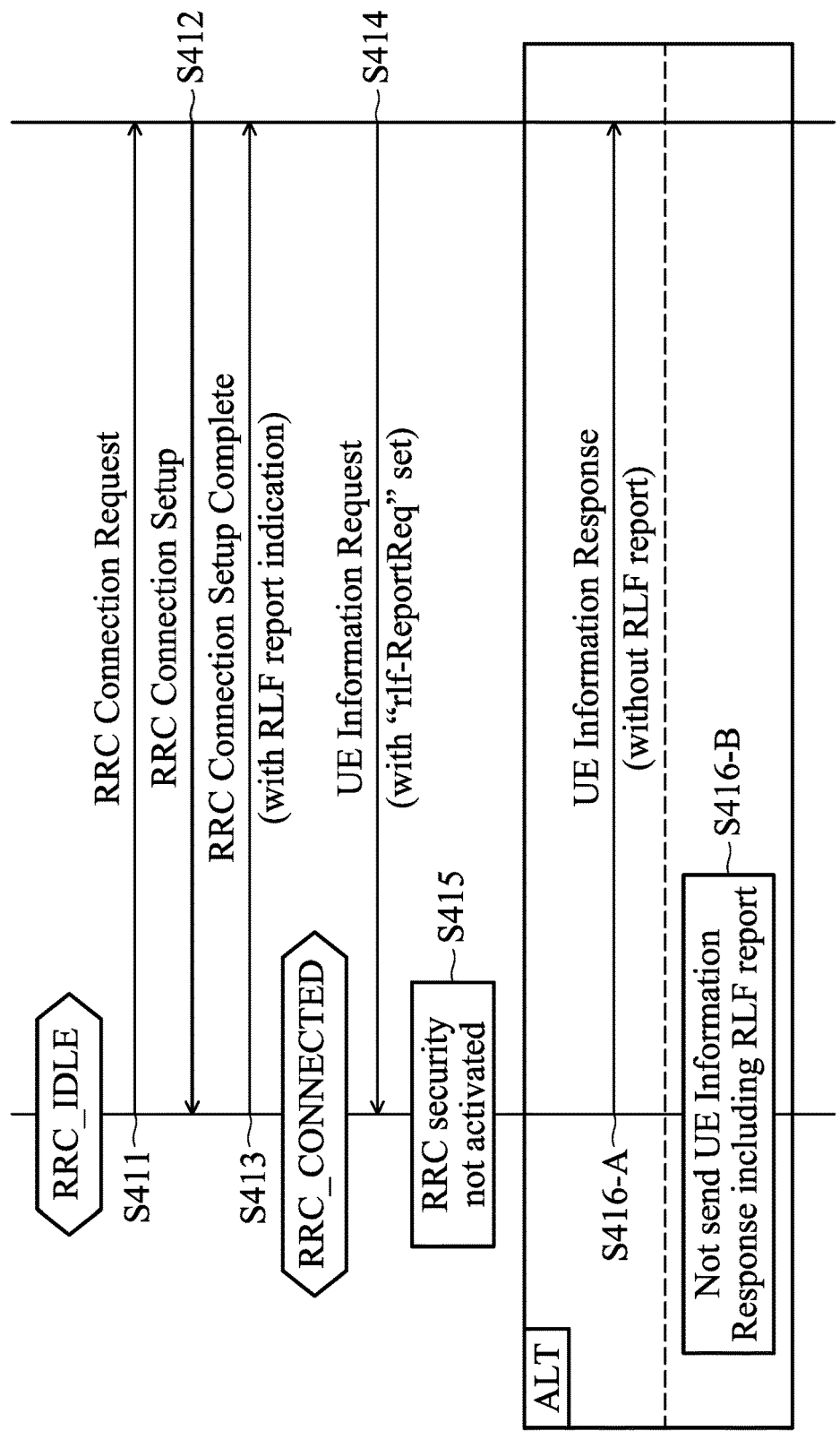

FIGS. 4A and 4B show a message sequence chart illustrating the method for avoiding location exposure in a UE information procedure according to an embodiment of the application. Similar to the embodiment of FIG. 3, the mobile communication device 110 first performs an RRC connection establishment procedure to establish an RRC connection with the service network 120 (steps S401~S403). Upon completing the RRC connection establishment procedure, the mobile communication device 110 enters the connected mode from the idle mode. To follow, the service network 120 initiates a security procedure to command the mobile communication device 110 for the activation of Access Stratum (AS) security. Specifically, the service network 120 sends a Security Mode Command message to the mobile communication device 110 (step S404), and the mobile communication device 110 replies to the service network 120 with a Security Mode Complete message (step S405).

Next, the mobile communication device 110 detects an occurrence of Radio Link Failure (RLF) (step S406). In response to the RLF, the mobile communication device 110 initiates an RRC connection re-establishment procedure to re-establish the RRC connection with the service network. Specifically, the mobile communication device 110 sends an RRC Connection Reestablishment Request message to the service network 120 (step S407), and then receives an RRC Connection Reestablishment message from the service network 120 (step S408). The RRC Connection Reestablishment message may include configuration for resuming the SRB1 and configuration for the serving cell. Subsequently, the mobile communication device 110 replies to the service network 120 with an RRC Connection Reestablishment Complete message which includes an availability indication of an RLF report (step S409), and the RRC connection re-establishment procedure ends.

After that, the mobile communication device 110 receives an RRC Connection Release message from the service network 120 (step S410), and enters the idle mode. Specifically, the mobile communication device 110 releases all the radio bearers established prior to receiving the RRC Connection Release message.

Later, when the mobile communication device 110 needs to enter the connected mode, it performs an RRC connection establishment procedure to establish an RRC connection with the service network 120 (steps S411~S413). Particularly, in step S413, the RRC Connection Setup Complete message includes an availability indication of an RLF report.

When receiving the RRC Connection Setup Complete message including an availability indication of an RLF report, the service network 120 initiates a UE information procedure by sending a UE Information Request message with a request for the RLF report (i.e., with "rlf-ReportReq" set to true) to the mobile communication device 110 (step S414). In response to receiving the UE Information Request message, the mobile communication device 110 determines whether the RRC security has been activated (step S415). In this embodiment, it is assumed that the RRC security has not been activated and the RLF report is present. Specifically, the RLF report includes location information of the mobile communication device 110.

In one embodiment to follow step S415, the mobile communication device replies to the service network 120 with a UE Information Response message not including the RLF report (step S416-A), and the UE information procedure ends. For example, the UE Information Response message may contain empty content to pretend that there's no RLF report available.

In another embodiment to follow step S415, the mobile communication device 110 does not send a UE Information Response message including the RLF report to the service network 120 even when the RLF report is available (step S416-B).

Alternatively, in yet another embodiment, the RRC Connection Setup Complete message in step S413 may not include an availability of an RLF report, so that the service network 120 may not initiate the UE information procedure to request the RLF report.

Figure 5A:
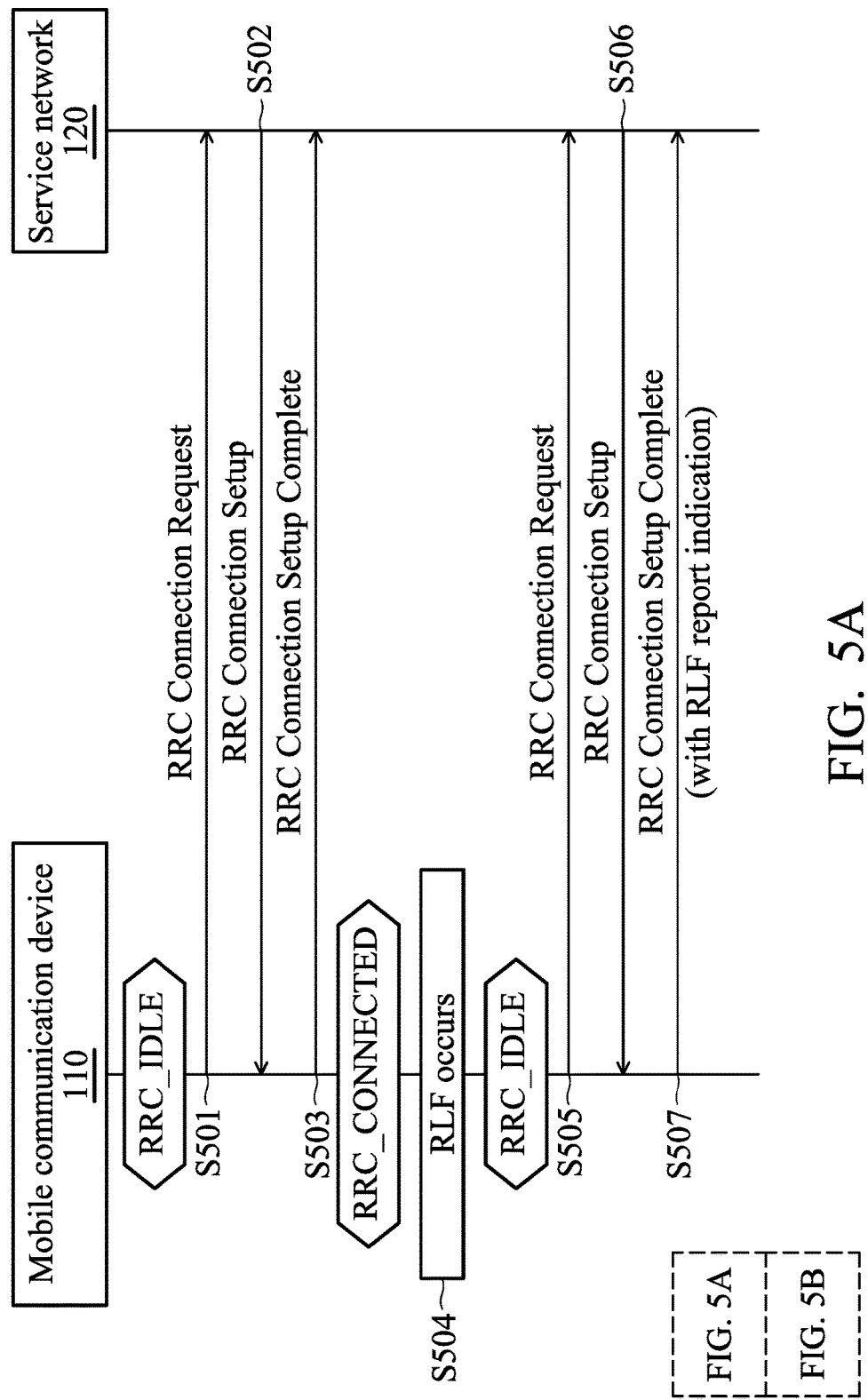
FIGS. 5A and 5B show a message sequence chart illustrating the method for avoiding location exposure in a UE information procedure according to another embodiment of the application.
Figure 5B:
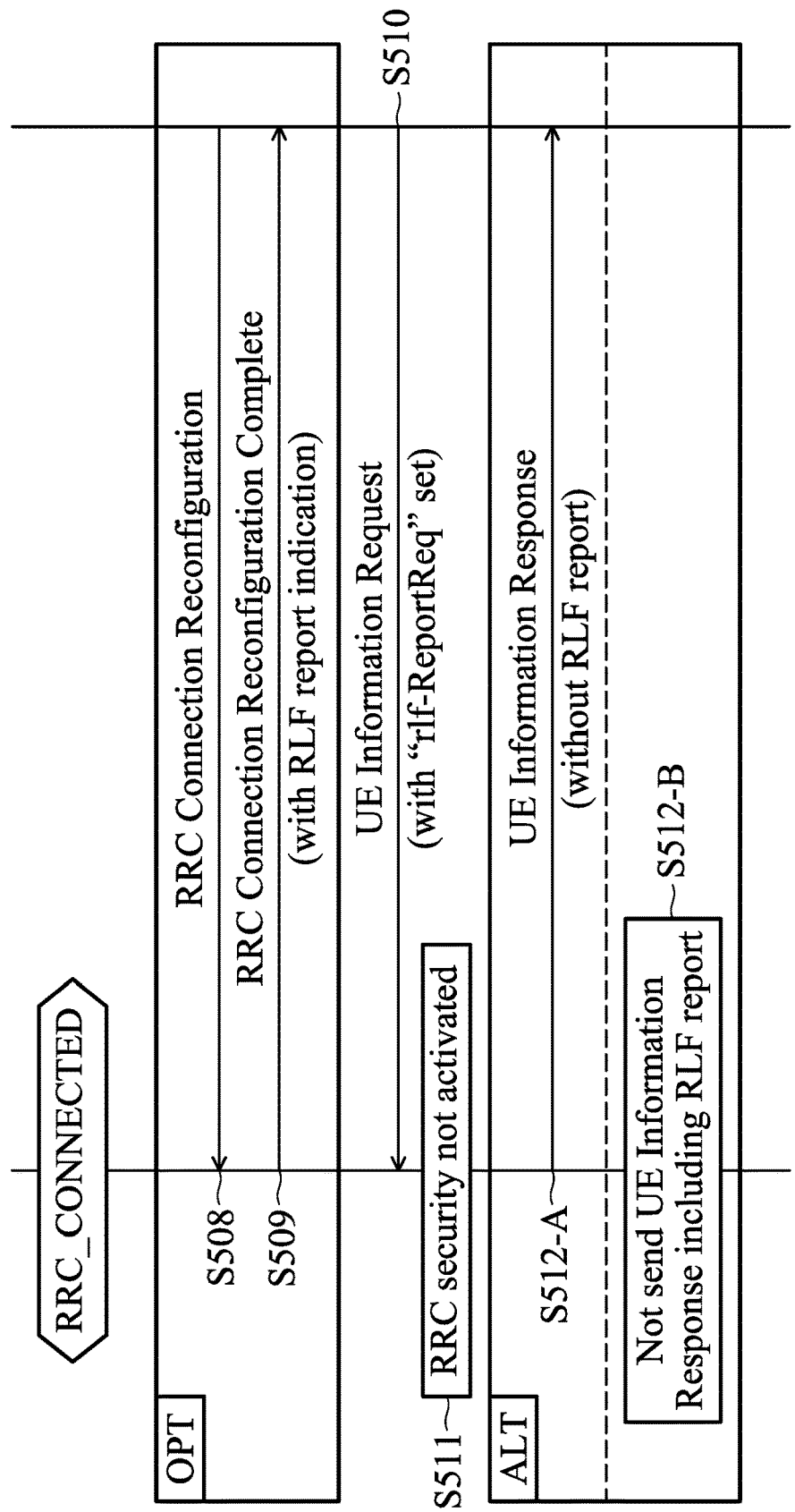

FIGS. 5A and 5B show a message sequence chart illustrating the method for avoiding location exposure in a UE information procedure according to another embodiment of the application. Similar to the embodiment of FIG. 3, the mobile communication device 110 first performs an RRC connection establishment procedure to establish an RRC connection with the service network 120 (steps S501~S503). Upon completing the RRC connection establishment procedure, the mobile communication device 110 enters the connected mode from the idle mode.

Next, the mobile communication device 110 detects an occurrence of RLF (step S504). In response to the RLF, the mobile communication device 110 returns to the idle mode from the connected mode, and initiates another RRC connection establishment procedure by sending an RRC Connection Request message to the service network 120 (step S505). Next, the mobile communication device 110 receives an RRC Connection Setup message from the service network 120 (step S506), and then replies to the service network 120 with an RRC Connection Setup Complete message which includes an availability indication of an RLF report (step S507), and the RRC connection establishment procedure ends. Upon completing the RRC connection establishment procedure, the mobile communication device 110 enters the connected mode again.

In one embodiment to follow step S507, the service network 120 may not initiate a UE information procedure to request the RLF report, and instead, send an RRC Connection Reconfiguration message to the mobile communication device 110 (step S508). In response, the mobile communication device 110 replies to the service network 120 with an RRC Connection Reconfiguration Complete message which includes an availability indication of an RLF report (step S509). Please note that steps S508 and S509 are optional, depending on the behavior of the service network 120.

When receiving the RRC Connection Setup Complete message including an availability indication of an RLF report or the RRC Connection Reconfiguration Complete message including an availability indication of an RLF report, the service network 120 initiates a UE information procedure by sending a UE Information Request message with a request for the RLF report (i.e., with "rlf-ReportReq" set to true) to the mobile communication device 110 (step S510). In response to receiving the UE Information Request message, the mobile communication device 110 determines whether the RRC security has been activated (step S511). In this embodiment, it is assumed that the RRC security has not been activated and the RLF report is present.

In one embodiment to follow step S511, the mobile communication device replies to the service network 120 with a UE Information Response message not including the RLF report (step S512-A), and the UE information procedure ends. For example, the UE Information Response message may contain empty content to pretend that there's no RLF report available.

In another embodiment to follow step S511, the mobile communication device 110 does not send a UE Information Response message including the RLF report to the service network 120 even when the RLF report is available (step S512-B).

Alternatively, in yet another embodiment, the RRC Connection Setup Complete message in step S507 and the RRC Connection Reconfiguration Complete message in step S509 may not include an availability indication of an RLF report, so that the service network 120 may not initiate the UE information procedure to request the RLF report.

It should be noted that the detailed description of RRC re-establishment procedure and the UE information procedure is omitted herein for brevity since it is beyond the scope of the application, and reference may be made to the 3GPP TS 36.331, v12.4.0.

In addition to requesting the RLF report, the service network 120 may also include a request for a connection-establishment-failure report (i.e., with "connEstFailReportReq" set to true), a logged measurement report (i.e., with "logMeasReportReq" set to true), or a mobility history report (i.e., with "mobilityHistoryReportReq" set to true) in the UE Information Request message.

The connection-establishment-failure report is used to store the information of connection establishment failure(s) that is/are encountered by the mobile communication device 110. Particularly, even if the UE Information Request message includes a request for a connection-establishment-failure report, the UE Information Response message in step S416-A or S512-A may not include the connection-establishment-failure report.

The logged measurement report is used to store the information of measurements periodically performed by the mobile communication device 110. Particularly, even if the UE Information Request message includes a request for a logged measurement report, the UE Information Response message in step S416-A or S512-A may not include the logged measurement report.

The mobility history report is used to store the information of cell path of the mobile communication device 110. Particularly, even if the UE Information Request message includes a request for a mobility history report, the UE Information Response message in step S416-A or S512-A may not include the mobility history report.

In view of the forgoing embodiment of FIGS. 3, 4A, 4B, 5A, and 5B, it will be appreciated that the present application improves the confidentiality of the UE's location information in measurement reporting and the UE information procedure, by not including the UE's location information in the unprotected Measurement Report/UE Information Response message, or by not sending the unprotected Measurement Report/UE Information Response message. Advantageously, the exposure of the UE's location information may be avoided.

While the application has been described by way of example and in terms of preferred embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A mobile communication device for avoiding location exposure on insecure communications, comprising:
   a wireless transceiver, configured to perform wireless transmission and reception to and from a service network; and
   a controller, configured to determine whether a Radio Resource Control (RRC) security has been activated between the mobile communication device and the service network, and in response to the RRC security not having been activated, does not send a measurement report to the service network via the wireless transceiver to avoid exposing location information of the mobile communication device present in the measurement report,
   wherein the controller is further configured to send the measurement report after the RRC security has been activated.

2. The mobile communication device of claim 1, wherein, in response to the RRC security not having been activated, the controller is further configured to not perform measurements or system information acquisition according to the measurement configuration until the RRC security has been activated.

3. The mobile communication device of claim 1, wherein, in response to the RRC security not having been activated, the controller is further configured to perform measurements or system information acquisition according to the measurement configuration, and not perform evaluations of the results of the measurements until the RRC security has been activated.

4. The mobile communication device of claim 1, wherein, in response to the RRC security not having been activated, the controller is further configured to perform measurements or system information acquisition according to the measurement configuration, and perform evaluations of the results of the measurements.

5. The mobile communication device of claim 1, wherein the location information of the mobile communication device comprises Global Positioning System (GPS) information of the mobile communication device or a measurement result of one or more cells.

6. A method for a mobile communication device to avoid location exposure on insecure communications, the method comprising:
   determining whether a Radio Resource Control (RRC) security has been activated between the mobile communication device and a service network;
   in response to the RRC security not having been activated, not sending a measurement report to the service network to avoid exposing location information of the mobile communication device present in the measurement report; and
   sending the measurement report after the RRC security has been activated.

7. The method of claim 6, further comprising:
   in response to the RRC security not having been activated, not performing measurements or system information acquisition according to the measurement configuration until the RRC security has been activated.

8. The method of claim 6, further comprising:
   in response to the RRC security not having been activated, performing measurements or system information acquisition according to the measurement configuration, and not performing evaluations of the results of the measurements until the RRC security has been activated.

9. The method of claim 6, further comprising:
   in response to the RRC security not having been activated, performing measurements or system information acquisition according to the measurement configuration, and performing evaluations of the results of the measurements.

10. The method of claim 6, wherein the location information of the mobile communication device comprises Global Positioning System (GPS) information of the mobile communication device or a measurement result of one or more cells.

11. A mobile communication device for avoiding location exposure on insecure communications, comprising:

a wireless transceiver, configured to perform wireless transmission and reception to and from a service network; and a controller, configured to:
  determine whether a Radio Resource Control (RRC) security has been activated between the mobile communication device and the service network after receiving one of (i) a User Equipment (UE) Information Request message, (ii) an RRC Connection Re-Establishment message, (iii) an RRC Connection Setup message, and (iv) an RRC Connection Reconfiguration message from the service network via the wireless transceiver;
  in response to the RRC security not having been activated between the mobile communication device and the service network after receiving the UE Information Request message from the service network via the wireless transceiver, not send a UE Information Response message to the service network via the wireless transceiver to avoid exposing location information of the mobile communication device present in the UE Information Response message; and
  in response to the RRC security not having been activated between the mobile communication device and the service network after receiving the one of the (ii) RRC Connection Re-Establishment message, the (iii) RRC Connection Setup message, and the (iv) RRC Connection Reconfiguration message from the service network via the wireless transceiver, send one of an RRC Connection Re-Establishment Complete message, an RRC Connection Setup Complete message, and an RRC Connection Reconfiguration Complete message to the service network via the wireless transceiver;
  wherein none of the RRC Connection Re-Establishment Complete message, the RRC Connection Setup Complete message, and the RRC Connection Reconfiguration Complete message includes an availability indication of any of a Radio Link Failure (RLF) report, a connection-establish-failure report, a logged measurement report, and a mobility history report that each exposes location information of the mobile communication device.

12. A method for a mobile communication device to avoid location exposure on insecure communications, the method comprising:
  determining whether a Radio Resource Control (RRC) security has been activated between the mobile communication device and a service network after receiving a UE Information Request message from the service network; and
  in response to the RRC security not having been activated, not sending a UE Information Response message to the service network to avoid exposing location information of the mobile communication device present in the UE Information Response message.

13. A method for a mobile communication device to avoid location exposure on insecure communications, the method comprising:
  determining whether a Radio Resource Control (RRC) security has been activated between the mobile communication device and the service network after receiving an RRC Connection Re-Establishment message, an RRC Connection Setup message, or an RRC Connection Reconfiguration message from the service network; and
  in response to the RRC security not having been activated, sending an RRC Connection Re-Establishment Complete message, an RRC Connection Setup Complete message, or an RRC Connection Reconfiguration Complete message,
  wherein none of the RRC Connection Re-Establishment Complete message, the RRC Connection Setup Complete message, and the RRC Connection Reconfiguration Complete message includes an availability indication of any of a Radio Link Failure (RLF) report, a connection-establish-failure report, a logged measurement report, and a mobility history report that each exposes location information of the mobile communication device.

14. The mobile communication device of claim 11, wherein the UE Information Response message comprises location information of the mobile communications device.

15. The method of claim 12, wherein the UE Information Response message comprises location information of the mobile communications device.

* * * * *